April 16, 1963  TATSUYA TAKAGI  3,085,661
OIL DAMPER
Filed Jan. 23, 1962
*Fig-1-*
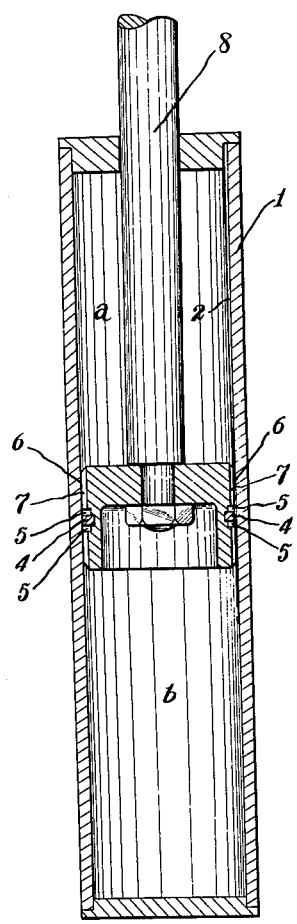
*Fig-2-*
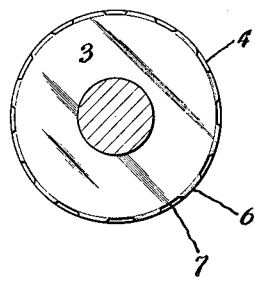
*Fig-3-*
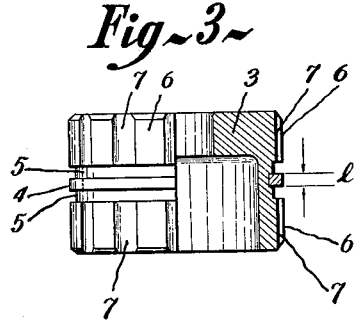
INVENTOR.
TATSUYA TAKAGI
BY *M. Glew and Toren*
ATTORNEYS 3,085,661
OIL DAMPER
Tatsuya Takagi, 46 Araebisu-machi, Nishinomiya-shi,
Hyogo-ken, Japan
Filed Jan. 23, 1962, Ser. No. 168,070
Claims priority, application Japan Jan. 24, 1961
1 Claim. (Cl. 188—96)

This invention relates to an oil damper, comprising a cylinder having one or a number of longitudinal grooves on its inner wall and a piston slidably fitted within said cylinder, said piston having a narrow annular sliding fit surface on a part of its periphery on one side or both sides of said sliding fit surface, annular groove or grooves and annular guide surfaces having equal diameter to said sliding fit surface being provided successively adjacent to each other, said guide surfaces being provided with several numbers of parallel longitudinal grooves in a certain interval, each one end of said longitudinal grooves being inter-connected with one of said annular grooves.

In oil dampers for damping the vibration of vehicles, it is publicly known that for the purpose of gradually increasing the generated damping force from half-way of piston stroke, the inside diameter of the cylinder is tapered to decrease gradually the jet flow clearance between the piston and cylinder, or longitudinal grooves are provided on the inside wall of the piston to form jet flow holes between the said grooves and outside surface of the piston as well as to make shallower the depth of said grooves gradually.

In such cases, the generated damping force is a sum of the speed energy $\frac{1}{2}mv^2$ of oil (wherein, $m$=weight of passing oil, $v$=velocity of the same) passing through the jet flow clearance or the jet flow hole and the frictional resistance of oil given by the jet flow clearance or the jet flow hole. Owing to the energy absorbed during its operation, it is unavoidable that the damper is raised in its temperature and decreased in its oil viscosity gradually, resulting in gradual decrease of its damping power.

The object of this invention is to eliminate the above mentioned defects and a preferred embodiment thereof is explained as follows with the aid of drawings in which:

FIG. 1 shows a longitudinal section of an oil damper according to this invention at the central part thereof.

FIG. 2 is a plan view of a piston which constitutes a part of this invention.

FIG. 3 is a side view of FIG. 2, wherein the right half thereof is longitudinally sectioned at its central part.

Now referring to the drawings, 1 is a cylinder, 2 is one or several numbers of grooves, which is or are provided on the inside wall of the cylinder and each groove is tapered to decrease its depth as it goes downwardly, 3 is a piston, 4 is an annular sliding fit surface having relatively narrow breadth (this annular sliding fit surface is preferably made of piston ring and the like), 5 is or are annular groove or grooves provided adjacent to the upper or lower part of the sliding fit surface or to both upper and lower parts thereof, 6 are annular guide surfaces of certain breadth, provided adjacent to more upper or lower part of the annular grooves or to both upper and lower parts thereof, having equal diameter to said sliding fit surface 4, provided with several numbers of parallel longitudinal grooves 7 at a certain interval between them as well as each one end of these grooves 7 being inter-connected with said annular grooves 5, and 8 is a piston rod, $a$ and $b$ show respectively the upper and lower rooms of the cylinder 1.

The oil damper according to this invention consists of the above mentioned parts and upon up and down stroke of the piston 3 within the cylinder 1, the oil in the cylinder will display a damping force when it moves between the upper chamber $a$ and the lower chamber $b$ passing through jet holes formed by the longitudinal grooves 2 and the sliding fit surface 4, however, in this case, since the length of jet flow path 1 is very short and accordingly the resistance due to oil viscosity is very small, the most part of the herein generated damping power is speed energy $\frac{1}{2}mv^2$ of jet flow of the oil. This speed energy has little concern with the viscosity of oil.

Since the oil damper according to this invention has little resistance due to the viscosity of oil, there is little possibility of decreasing the damping force affected by the change of viscosity due to rise and drop of oil temperature, and further the breadth of annular sliding fit surface 4 is made narrow and difficult to be proof against wear and tear as it is, so that there are provided annular guide surfaces 6 of certain breadth having longitudinal grooves 7 on upper or lower part of the sliding fit surface or on both upper and lower parts thereof to furnish free passage for the oil, inducing slide motion, and in case when the guide surfaces fall on the longitudinal grooves 2 of cylinder, narrow and long jet flow holes are formed contrary to the purpose, then the oil may flow through longitudinal grooves 7 and annular grooves 5.

What is claimed is:

An oil-filled, hollow cylinder having at least one groove extending longitudinally in the inner wall surface of said cylinder, said groove having a depth dimension in said cylinder's inner wall surface which tapers from one end of said cylinder to the opposite end of said cylinder; and, a solid cylindrical piston fitted within said cylinder, said piston having a circumferential wall surface adapted to bear against said cylinder's inner wall surface and adapted for sliding movement in a direction along the longitudinal axis of said hollow cylinder, said piston's circumferential wall surface having two spaced apart circumferentially running grooves therein separated by an annular wall surface section of said piston's circumferential wall surface, a first plurality of circumferentially spaced apart longitudinal grooves extending from one said circumferentially running groove to one end of said piston in a direction parallel to the longitudinal axes of said hollow cylinder and said piston, and a second plurality of circumferentially spaced apart longitudinal grooves extending from the other of said circumferentially running grooves to the opposite end of said piston in a direction parallel to the longitudinal axis of said hollow cylinder and said piston.

References Cited in the file of this patent
UNITED STATES PATENTS

| 1,383,094 | Fitzgerald | June 28, 1921 |
| 1,650,742 | Rowan | Nov. 29, 1927 |
| 2,206,110 | Myers et al. | July 2, 1940 |

FOREIGN PATENTS

| 879,038 | Germany | June 8, 1953 |